US008565445B2

(12) United States Patent
Matsuo

(10) Patent No.: US 8,565,445 B2
(45) Date of Patent: Oct. 22, 2013

(54) COMBINING AUDIO SIGNALS BASED ON RANGES OF PHASE DIFFERENCE

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 12/621,706

(22) Filed: Nov. 19, 2009

(65) Prior Publication Data

US 2010/0128895 A1 May 27, 2010

(30) Foreign Application Priority Data

Nov. 21, 2008 (JP) ................................ 2008-297815

(51) Int. Cl.
*H04R 3/00* (2006.01)
*H04R 1/40* (2006.01)
*G01S 3/00* (2006.01)

(52) U.S. Cl.
USPC ................ 381/92; 381/97; 381/122; 367/125

(58) Field of Classification Search
USPC ............... 381/92, 97, 356, 122, 123; 367/125
See application file for complete search history.

(56) References Cited

U.S. PATENT DOCUMENTS 6,766,029 B1 * 7/2004 Maisano ...................... 381/313
2007/0047743 A1 * 3/2007 Taenzer et al. .................. 381/92
2007/0274536 A1 11/2007 Matsuo
2008/0181058 A1 7/2008 Hayakawa
2008/0219470 A1 9/2008 Kimijima

FOREIGN PATENT DOCUMENTS

EP 0 802 699 A2 10/1997
JP 2001-100800 4/2001
JP 2005-229420 8/2005
JP 2007-248534 9/2007
JP 2007-318528 12/2007
JP 2008-185834 8/2008
JP 2008-227595 9/2008

OTHER PUBLICATIONS

Journal of the Acoustical Society of Japan, vol. 51 No. 5, "A small special feature—microphone array—," pp. 384-414 (May 1, 1995).
German Office Action issued Aug. 16, 2010 in corresponding German Patent Application 10 2009 052 539.4-31.
Japanese Notification of Reason for Refusal mailed Feb. 19, 2013, issued in corresponding Japanese Patent Application No. 2008-297815.
Japanese Office Action for corresponding Japanese Application No. 2008-297815; dated Jul. 9, 2013.

* cited by examiner

*Primary Examiner* — Vivian Chin
*Assistant Examiner* — Douglas Suthers
(74) *Attorney, Agent, or Firm* — Staas & Halsey LLP

(57) ABSTRACT

A signal processing unit is provided. The signal processing unit includes an orthogonal transforming part including at least two sound input parts receiving input sound signals on a time axis, the orthogonal transforming part transforming two of the input sound signals into respective spectral signals on a frequency axis, a phase difference calculating part obtaining a phase difference between the two spectral signals on the frequency axis, and a filter part phasing, when the phase difference is within a given range, each component of a first one of the two spectral signals based on the phase difference at each frequency to calculate a phased spectral signal and combining the phased spectral signal and a second one of the two spectral signals to calculate a filtered spectral signal.

21 Claims, 7 Drawing Sheets

COMBINING AUDIO SIGNALS BASED ON RANGES OF PHASE DIFFERENCE

CROSS-REFERENCE TO RELATED APPLICATION(S)

This application is related to and claims priority to Japanese Patent Application No. 2008-297815, filed on Nov. 21, 2008, and incorporated herein by reference.

BACKGROUND

1. Field

The embodiments discussed herein are directed to processing of sound signals.

2. Description of the Related Art

A microphone array includes an array of plural microphones and may give directivity to a sound signal by processing the sound signal obtained by receiving and converting sound. (see to the extract of references about a microphone array: Journal of the Acoustical Society of Japan Vol. 51 No. 5, "A small special feature—microphone array—", pp. 384-414 (1995))

In a microphone array system, sound signals derived from plural microphones may be may be processed such that undesired noises in sound waves coming from directions different from the direction in which desired signal is received or coming from the direction of suppression may be suppressed, in order to improve the SNR (signal-to-noise ratio).

Typically a noise component-suppressing system as disclosed in Japanese Laid-open Patent Publication No. 2001-100800, includes a first means for detecting sound at plural positions to obtain an input signal at each different sound receiving position, frequency-analyzing the input signal, and obtaining frequency components for different channels, a first beam former processing means for suppressing noises coming from the direction of a speaker and obtaining desired sound components by a filtering process using filtering coefficients that provide lower sensitivities to frequency components of the various channels outside the desired direction, a second beam former processing means for suppressing speech of the speaker and obtaining noise components by a filtering process that provide lower sensitivities to frequency components of the channels obtained by the first means outside the desired direction, an estimation means for estimating the direction of noise from filter coefficients of the first beam former processing means and estimating the direction of intended speech from the filter coefficients of the second beam former processing means, a modification means for modifying the direction of arrival of the intended speech to be entered into the first beam former processing means according to the direction of intended speech estimated by the estimation means and modifying the direction of arrival of noise to be entered into the second beam former processing means according to the direction of noise estimated by the estimation means, a subtraction means for performing a spectral subtraction operation based on the outputs from the first and second beam former processing means, a means for obtaining a directivity index corresponding to the time differences between arriving sounds and amplitude differences from the output from the first means, and a control means for controlling the spectral subtraction operation based on the directivity index and on the direction of the intended speech obtained by the first means.

Typically, a directional sound collector as disclosed in Japanese Laid-open Patent Publication No. 2007-318528, includes sound inputs from sound sources existing in plural directions are accepted and converted into signals on the frequency axis. A suppression function for suppressing the converted signal on the frequency axis is calculated. The calculated suppression function is multiplied by the amplitude component of the original signal on the frequency axis, thus correcting the converted signal on the frequency axis. Phase components of converted signals on each frequency axis are calculated at each individual frequency. In this way, the differences between the phase components are calculated. A probability value indicating the probability at which a sound source is present in a given direction is calculated based on the calculated differences. Based on the calculated probability value, a suppression function for suppressing sound inputs from sound sources other than sound sources lying in the given direction is calculated.

SUMMARY

It is an aspect of the embodiments discussed herein to provide a signal processing unit. The signal processing unit includes an orthogonal transforming part including at least two sound input parts receiving input sound signals on a time axis, the orthogonal transforming part transforming two of the input sound signals into respective spectral signals on a frequency axis; a phase difference calculating part obtaining a phase difference between the two spectral signals on the frequency axis; and a filter part phasing, when the phase difference is within a given range, each component of a first one of the two spectral signals based on the phase difference at each frequency to calculate a phased spectral signal and combining the phased spectral signal and a second one of the two spectral signals to calculate a filtered spectral signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE EMBODIMENTS

Figure 1:
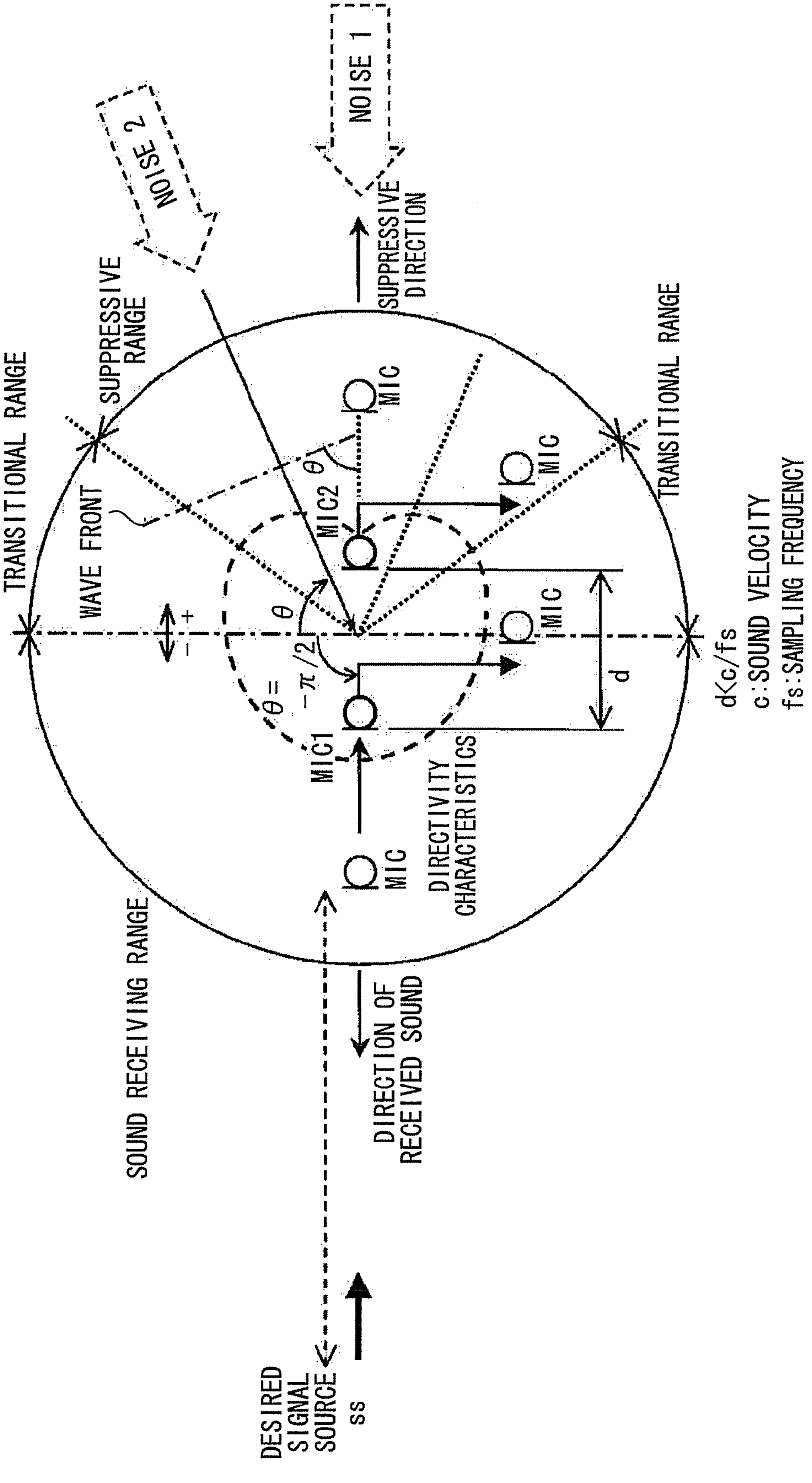
FIG. 1 illustrates an exemplary array of microphones including at least two microphones, the array of microphones being included in sound input parts in an exemplary embodiment.

In a speech processor including plural sound input parts, sound signals may be processed in the time domain such that a direction of suppression may be set in a direction opposite to the direction of reception of desired sound, and samples of the sound signals are delayed and subtractions among them are performed. In these processing operations, noise coming from the direction of suppression may be suppressed sufficiently. However, where there are plural directions of arrival of background noise such as in-vehicle noise arising from operation of a vehicle and noise originating from a crowd, background noises may arrive from plural directions of suppression. Therefore, it is hard to suppress the noises sufficiently. On the other hand, if the number of the sound input parts is increased, the noise-suppressing capabilities are enhanced but the cost is increased. Furthermore, the size of the sound input parts increases.

In a case where sound signals including signals from sound sources lying in plural directions and noise are entered, it may not be necessary to install a large number of microphones. Sound signals emitted from sound sources lying in given directions may be emphasized by using the noise component suppressor including a simple structure, and ambient noise may be suppressed.

A probability value indicative of the probability at which a sound source is present in a given direction is calculated, and a suppression function for suppressing inputting of sound arising from sound sources other than sound sources lying in the given direction may be calculated based on the calculated probability value.

Noise in an apparatus including plural sound input parts may be suppressed more accurately and efficiently by synchronizing two sound signals in the frequency domain according to the directions of sources of sound arriving at the sound input parts and performing a subtraction.

According to an exemplary embodiment a sound signal may be produced in which the ratio of noise to signal has been reduced by processing the sound signal in the frequency domain.

According to an exemplary embodiment, a signal processing unit includes sound input parts having an orthogonal transforming part, a phase difference calculating part, and a filter part. The orthogonal transforming part selects two sound signals from sound signals entered from the sound input parts, the entered sound signals being signals on the time axis, and transforms the selected two sound signals into spectral signals on the frequency axis. The phase difference calculating part obtains the phase difference between the two spectral signals obtained by transforming. Where the phase difference is within a given range, the filter part phases each component of a first spectral component of the two spectral signals at each frequency to calculate a phased spectral signal, and combining the phased spectral signal and a second spectral signal of the two spectral signals to calculate a filtered spectral signal.

According to an exemplary embodiment a method and a computer readable recording medium storing a computer program for executing the above-described signal processing unit are also disclosed.

According to an exemplary embodiment, a sound signal in which the ratio of noise to sound has been reduced in a relative manner may be calculated.

FIG. 1 illustrates an exemplary array of at least two microphones MIC1, MIC2, and so forth included in plural sound input parts.

Generally, the plural microphones (such as MIC1 and MIC2) of the array are spaced from each other by a known distance d on a straight line The MIC1 and MIC2 which are at least two of the plural microphones adjacent to each other may be arranged at an interval of d on the straight line. The microphones do not need to be evenly spaced from each other. As long as the sampling theorem is satisfied, they may be spaced from each other by known uneven distances.

An exemplary embodiment in which two microphones MIC1 and MIC2 are used out of the plural microphones is described.

FIG. 1 illustrates a desired signal source SS on a straight line passing through the microphones MIC1 and MIC2 and on the left side of FIG. 1. The desired signal source SS may exist in the direction of receiving sound for the array of the microphones MIC1 and MIC2 or in the desired direction. The sound source SS from which sound should be received may the mouth of the speaker. The direction of receiving sound may be defined to be the direction of the mouth of the speaker. A given angular range around the angular direction along which sound is received may be defined as an angular range of receiving sound. The direction (+π) opposite to the direction of receiving sound may be taken as the direction of main suppression of noise. The given angular range around the angular direction of main suppression may be taken as the angular range of suppression of noise. The angular range of suppression of noise may be determined at each different frequency f.

A distance d between the microphones MIC1 and MIC2 may be so set as to satisfy the relationship in equation (1):

$$\text{distance } d<\text{sonic velocity } c/\text{sampling frequency } fs \tag{1}$$

such that the sampling theorem or Nyquist theorem is met.

In FIG. 1, the directivity characteristic or directivity pattern of the array of microphones MIC1 and MIC2 are depicted by a closed broken line (such as a cardioid). An input signal of sound that is received and processed by the array of microphones MIC1 and MIC2 depends on the angle of incidence θ (=−π/2 to +π/2) of sound waves with respect to the straight line on which the array of the microphones MIC1 and MIC2 is disposed. However, the input signal does not depend on the direction of incidence (0 to 2π) in a radial direction on a plane perpendicular to the straight line.

Sound from the desired signal source SS may be detected by the right microphone MIC2 with a delay time of T=d/c relative to the left microphone MIC1. On the other hand, noise 1 coming from the direction of main suppression may be detected by the left microphone MIC1 with a delay time of T=d/c relative to the right microphone MIC2. Noise 2 coming from a direction of suppression within the range of suppression that is shifted from the direction of main suppression may be detected by the left microphone MIC1 with a delay time of T=d·sin θ/c relative to the right microphone MIC2. The angle θ defines the direction from which the noise 2 comes in the assumed direction of suppression. In FIG. 1, the dot-and-dash line illustrates the wave front of the noise 2. In the case where θ=+π/2, the direction of arrival of the noise 1 is the direction of suppression of input signal.

Noise 1 (θ=+π/2) coming from the direction of main suppression may be suppressed by subtracting the input signal IN2(*t*) to the right microphone MIC2 from the input signal IN1(*t*) to the left microphone MIC1 adjacent to the microphone MIC2, the input signal IN2(*t*) being delayed by T=d/c relative to the input signal IN1(*t*). However, it may be difficult to suppress noise 2 coming from the angular directions (0<θ<+π/2) deviating from the direction of main suppression.

Noise coming from directions in the range of suppression may be suppressed sufficiently by phase synchronizing one of spectra of input signals to the microphones MIC1 and MIC2 with the other spectra according to the phase difference between the two input signals at each frequency and taking the difference between the two spectra.

Figure 2:
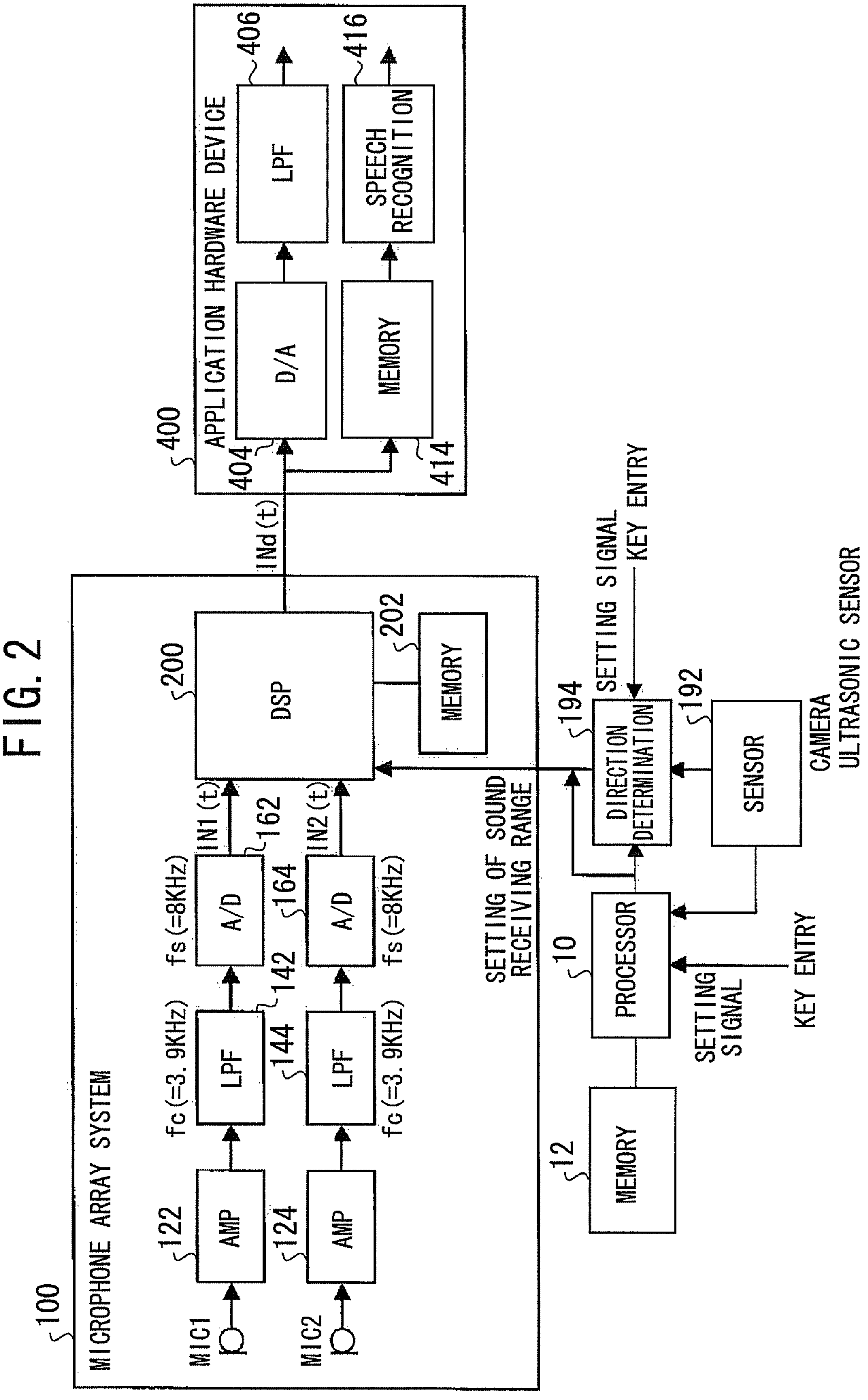
FIG. 2 illustrates an exemplary microphone array system including exemplary microphones illustrated in FIG. 1.

FIG. 2 illustrates a microphone array system 100 including microphones MIC1 and MIC2 illustrated in FIG. 1 according to one embodiment. The microphone array system 100 has the microphones MIC1, MIC2, amplifiers (AMPs) 122, 124, low-pass filters (LPFs) 142, 144, a digital signal processor (DSP) 200, and a memory 202 (as including a RAM). For example, the microphone array system 100 may be an in-vehicle device having a speech recognition function, a car navigation system, or an information technology device (such as a hands-free phone or cell phone).

Optionally, the microphone array system 100 may be coupled to a sensor 192 for detecting the direction of a speaker and to a direction determination part 194. Alternatively, the array system 100 may include these components 192 and 194. A processor 10 and a memory 12 may be included in one apparatus including an application hardware device 400 or in a separate information processor.

The sensor 192 for detection of the direction of the speaker may be a digital camera, an ultrasonic sensor, or an infrared sensor, for example. The direction determination part 194 may also be installed on the processor 10 and operate according to a program for determining the direction, the program being stored in the memory 12.

Analog input signals converted from sound by the microphones MIC1 and MIC2 are supplied to the amplifiers 122 and 124, respectively, and amplified. The outputs of the amplifiers 122 and 124 are coupled to the inputs of the low-pass filters 142 and 144, respectively, having a cutoff frequency fc of 3.9 kHz, for example, such that only low-frequency components are passed. In this example, only the low-pass filters are used. Instead, band-pass filters may be used. Alternatively, high-pass filters may be used in combination.

The outputs of the low-pass filters 142 and 144 are coupled to the inputs of analog-to-digital converters 162 and 164, respectively, having a sampling frequency fs (fs>2fc) of 8 kHz, for example. The output signals from the filters 142 and 144 are converted into digital input signals. The digital input signals IN1(*t*) and IN2(*t*) in the time domain from the converters 162 and 164, respectively, are coupled to inputs of the digital signal processor (DSP) 200.

The digital signal processor 200 converts the time-domain digital signals IN1(*t*) and IN2(*t*) into frequency-domain signals using the memory 202, processes the signals to suppress noise coming from the suppressive angular range, and calculates a processed digital output signal INd(t) in the time domain.

The digital signal processor 200 may be coupled to the direction determination part 194 or to the processor 10. In this case, the processor 200 suppresses noise coming from the direction of suppression within the suppressive range on the opposite side of the sound receiving range in response to information delivered from the direction determination part 194 or processor 10, the information indicating the sound receiving range.

The direction determination part 194 or processor 10 may calculate the information indicative of the sound receiving range by processing a setting signal keyed in by the user. The direction determination part 194 or processor 10 may detect or recognize the presence of a speaker based on data (which may be detection data or image data) detected by the sensor 192, determine the direction in which the speaker is present, and calculate the information indicative of the sound receiving range.

The digital output signal INd(t) may be used, for example, for speech recognition or for conversations using cell phones. The digital output signal INd(t) is supplied to the following application hardware device 400, where the digital signal is converted into analog form, for example, by a digital-to-analog converter (D/A converter) 404 and passed through a low-pass filter (LPF) 406 to pass only low-frequency components. Thus, an analog signal is calculated or stored in the memory 414 and used in a speech recognition part 416 for speech recognition. The speech recognition part 416 may be either a processor installed as a hardware device or a processing software module operated according to a program stored in the memory 414, for example, including a ROM and a RAM.

The digital signal processor 200 may be either a signal processing circuit that is installed as a hardware device or a signal processing circuit operated according to a software program stored in the memory 202, for example, including a ROM and a RAM.

In FIG. 1, the microphone array system 100 may set an angular range around the direction $\theta(=-\pi/2)$ of the desired signal source (e.g., $-\pi/2\leq\theta<0$) as the sound receiving range. The system may set an angular range around the direction of main suppression $\theta=+\pi/2$ (e.g., $+\pi/6<\theta\leq+\pi/2$) as a suppressive range. Furthermore, the microphone array system 100 may set angular ranges between the sound receiving range and the suppressive range (e.g., $0\leq\theta\leq+\pi/6$) as transitional ranges.

Figure 3A:
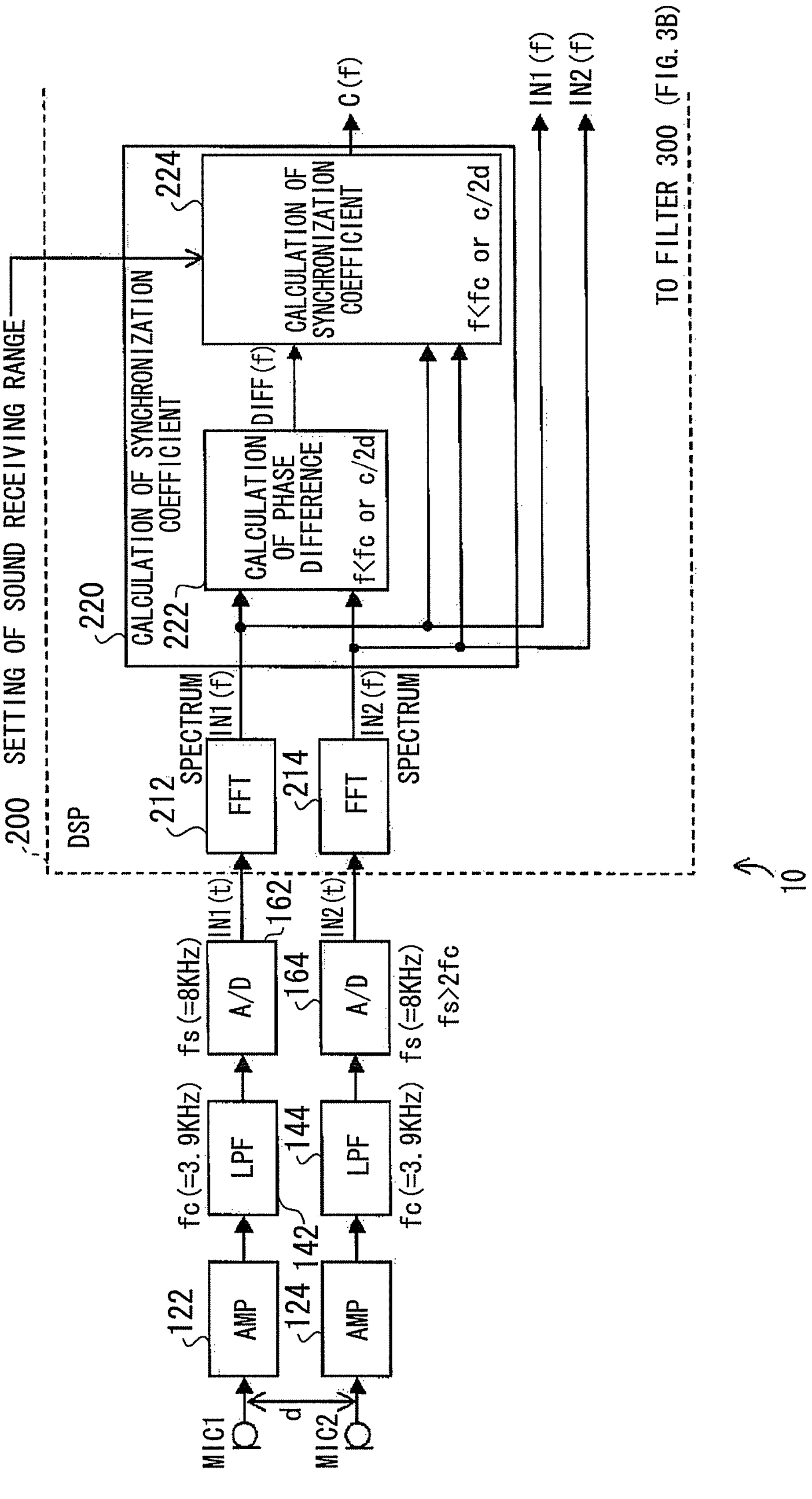
FIGS. 3A and 3B illustrate an exemplary microphone array system, the system being capable of reducing noise in a relative manner by noise suppression.
Figure 3B:
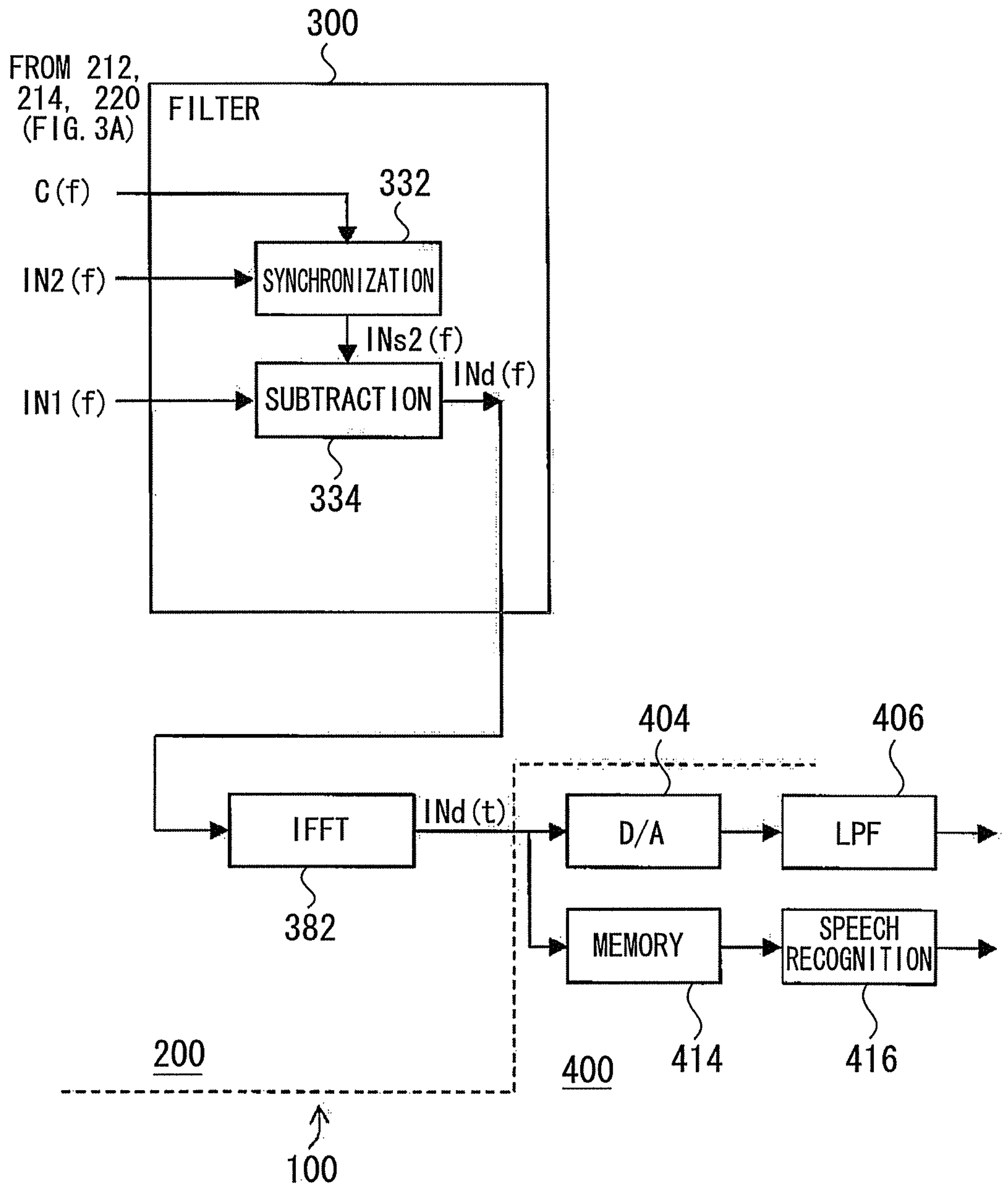

FIGS. 3A and 3B illustrate a microphone array system 100 capable of reducing noise in a relative manner by noise suppression using the arrangement of the array of the microphones MIC1 and MIC2.

The digital signal processor 200 includes fast Fourier transform (FFT) devices 212 and 214 whose inputs are coupled to the outputs of the analog-to-digital converters (A/D converters) 162 and 164, respectively, a synchronization coefficient generation part 220, and a filter part 300. In this embodiment, a fast Fourier transform may be used for frequency conversion or orthogonal transform. Other functions capable of frequency conversion such as discrete cosine transform or wavelet transform may also be used.

The synchronization coefficient generation part 220 includes a phase difference calculating part 222 for calculating the phase difference between complex spectra at each frequency f and a synchronization coefficient calculating part 224. The filter part 300 includes a synchronization part 332 and a subtraction part 334.

The time-domain digital input signals IN1(*t*) and IN2(*t*) from the analog-to-digital converters 162 and 164 are supplied to the inputs of the fast Fourier transform (FFT) devices 212 and 214, respectively. The FFT devices 212 and 214 are of a known construction and calculate complex spectra IN1(*f*) and IN2(*f*), respectively, in the frequency domain by multiplying each signal interval of the digital input signals IN1(*t*) and IN2(*t*) by an overlapping window function and Fourier-transforming or orthogonally transforming the products in equation (2):

$$N1(f)=A_1e^{j(2\pi ft+\phi1(f))}\ IN2(f)=A_2e^{j(2\pi ft+\phi2(f))} \qquad (2)$$

where f is a frequency. $A_1$ and $A_2$ are amplitudes, j is the imaginary unit. $\phi1(f)$ and $\phi2(f)$ are delay phases that are functions of the frequency f. For example, a Hamming window function, Hanning window function, Blackman window function, three Sigma Gauss window function, or triangular window function may be used as an overlapping window function.

The phase difference calculating part 222 obtains the phase difference DIFF(f) (in radians) between the phase spectral components indicating the direction of a sound source at each frequency f of the two adjacent microphones MIC1 and MIC2 spaced from each other by a distance of d, using the following equation (3):

$$DIFF(f) = \tan^{-1}(IN2(f)/IN1(f)) \tag{3}$$
$$= \tan^{-1}((A_2 e^{j(2\pi ft+\varphi 2(f))}/A_1 e^{j(2\pi ft+\varphi 1(f))})$$
$$= \tan^{-1}((A_2/A_1)e^{j(\varphi 2(f)-\varphi 1(f))})$$

An approximation may be made where there is only one source of noise (or sound source) of a certain frequency f. Where an approximation may be made where the amplitudes $A_1$ and $A_2$ of the input signals to the microphones MIC1 and MIC2, respectively, are equal, it is possible to introduce an equality given by (|IN1(*f*)|=|IN2(*f*)|). Also, it is possible to approximate the value of A2/A1 by unity.

Figure 4:
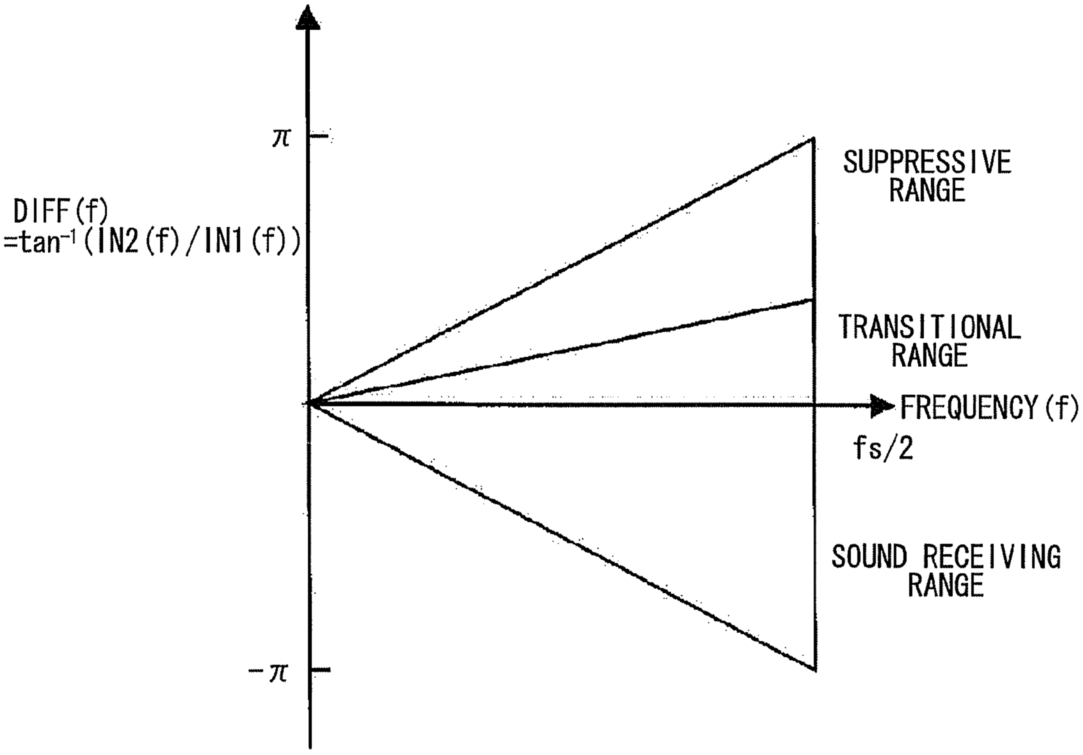
FIG. 4 illustrates an exemplary phase difference between phase spectral components at each frequency, the phase spectral components being calculated by a phase difference calculating part.

FIG. 4 illustrates the phase difference DIFF(f) (−π≤DIFF (f)≤π) between phase spectral components at each frequency induced by the arrangement of the microphone array of FIG. 1 including MIC1 and MIC2. The spectral components have been calculated by the phase difference calculating part 222.

The phase difference calculating part 222 supplies the value of the phase difference DIFF(f) in phase spectral component at each frequency f between the two adjacent input signals IN1(*f*) and IN2(*f*) to the synchronization coefficient calculating part 224.

The synchronization coefficient calculating part 224 estimates that at the certain frequency f, noise in the input signal at the position of the microphone MIC2 within the suppressive range θ (e.g., +π/6<θ≤+π/2) has arrived with a delay of phase difference DIFF(f) relative to the same noise in the input signal to the microphone MIC1. In each transitional range θ (e.g., 0≤θ≤+π/6) at the position of the microphone MIC1, the synchronization coefficient calculating part 224 gradually varies or switches the method of processing in the sound receiving range and the noise suppression level in the suppressive range.

The synchronization coefficient calculating part 224 calculates a synchronization coefficient C(f) according to the following formula, based on the phase difference DIFF(f) between the phase spectral components at each frequency f.

The synchronization coefficient calculating part 224 successively calculates synchronization coefficients C(f) for each timewise analysis frame (window) i in fast Fourier transform, where i (0, 1, 2, . . . ) is a number indicating a timewise order of each analysis frame. Where the phase difference DIFF(f) has a value lying within a suppressive range (e.g., +π/6<θ≤+π/2), synchronization coefficient C(f, i)=Cn(f, i).

Where the initial timewise order i=0, $$C(f, 0) = Cn(f, 0)$$
$$= IN1(f, 0)/IN2(f, 0)$$

Where the timewise order i>0, $$C(f, i) = Cn(f, i)$$
$$= \alpha C(f, i-1) + (1-\alpha)IN1(f, i)/IN2(f, i)$$

IN1 (*f, i*)/IN2 (*f, i*) is the ratio of the complex spectrum of the input signal to the microphone MIC1 to the complex spectrum of the input signal to the microphone MIC2, i.e., represents the amplitude ratio and the phase difference. IN1 (*f, i*)/IN2 (*f, i*) may represent the reciprocal of the ratio of the complex spectrum of the input signal to the microphone MIC2 to the complex spectrum of the input signal to the microphone MIC1. α indicates the ratio of addition or ratio of combination of the amount of delayed phase shift of the previous analysis frame for synchronization and is a constant lying in the range 0≤α<1. 1−α indicates the ratio of combination of the amount of delayed phase shift of the current analysis frame added for synchronization. The synchronization coefficient C(f, i) obtained by adding the synchronization coefficient of the previous analysis frame and the ratio of the complex spectrum of the input signal to the microphone MIC1 to the complex spectrum of the input signal to the microphone MIC2 for the current analysis frame at a ratio of α:(1−α).

Where the phase difference DIFF(f) has a value lying within the sound receiving range (e.g., −π/2≤θ<0), the synchronization coefficient has the relationship:

$$C(f)=Cs(f)$$

$$C(f)=Cs(f)=\exp(-j2\pi f/fs) \text{ or}$$

$C(f)=Cs(f)=0$ (in a case where synchronized subtraction is not applied)

Where the phase difference DIFF(f) has a value indicating an angle θ (e.g., 0≤θ≤+π/6) within one transitional range, the synchronization coefficient C(f) (=Ct(f)) is the weighted average of Cs(f) of (a) and Cn(f) according to the angle θ. That is, $$C(f) = Ct(f)$$
$$= Cs(f)\times(\theta-\theta t\min)/(\theta t\max-\theta t\min) +$$
$$Cn(f)\times(\theta t\max-\theta)/(\theta t\max-\theta t\min)$$

where θtmax indicates the angle of the boundary between each transitional range and the suppressive range and θtmin indicates the angle of the boundary between each transitional range and the sound receiving range.

In this way, the phase difference calculating part 222 calculates the synchronization coefficient C(f) according to the complex spectra IN1(*f*) and IN2(*f*) and supplies the complex spectra IN1(*f*), IN2(*f*), and synchronization coefficient C(f) to the filter part 300.

In the filter part 300, the synchronization portion 332 performs a multiplication given by the following formula to synchronize the complex spectrum IN2(*f*) to the complex spectrum IN1(*f*), generating a synchronized spectrum INs2(*f*) as in equation (4):

$$INs2(f)=C(f)\times IN2(f) \tag{4}$$

The subtraction part 334 calculates a noise-suppressed complex spectrum INd(f) by subtracting the complex spectrum INs2(*f*) multiplied by a coefficient β(f) from the complex spectrum IN1(*f*) according to the following formula (5):

$$INd(f)=IN1(f)-\beta(f)\times INs2(f) \tag{5}$$

where the coefficient β(f) is a preset value lying within a range given by 0≤β(f)≤1. The coefficient β(f) is a function of the frequency f and used to adjust the degree to which the synchronization coefficient is reduced. For example, the coefficient β(f) may be so set that the direction from which sound arrives within the suppressive range as indicated by the phase difference DIFF(f) is greater than the direction from which sound arrives within the sound receiving range, for example, in order to greatly suppress noise that is sound coming from within the suppressive range while suppressing generation of distortion of a signal arriving from within the sound receiving range.

The digital signal processor 200 further includes an inverse fast Fourier transform (IFFT) device 382, which receives the spectrum INd(f) from the synchronization coefficient calculating part 224 and inverse Fourier transforms and overlap-adds the spectrum, thus generating a time-domain output signal INd(t) at the position of the microphone MIC1.

The output of the IFFT device 382 may be coupled to the input of the following application hardware device 400.

The digital output signal INd(t) may be used, for example, for speech recognition or for conversations using cell phones. The digital output signal INd(t) is supplied to the following application hardware device 400, where the digital signal is converted into analog form, for example, by the digital-to-analog converter 404 and passed through the low-pass filter 406 to pass only low-frequency components. Thus, an analog signal is calculated or stored in the memory 414 and used in a speech recognition part 416 for speech recognition.

The components 212, 214, 220-224, 300-334, and 382 shown in FIGS. 3A and 3B may be incorporated in an integrated circuit or replaced by program blocks executed by the digital signal processor (DSP) 200 loaded with a program.

Figure 5:
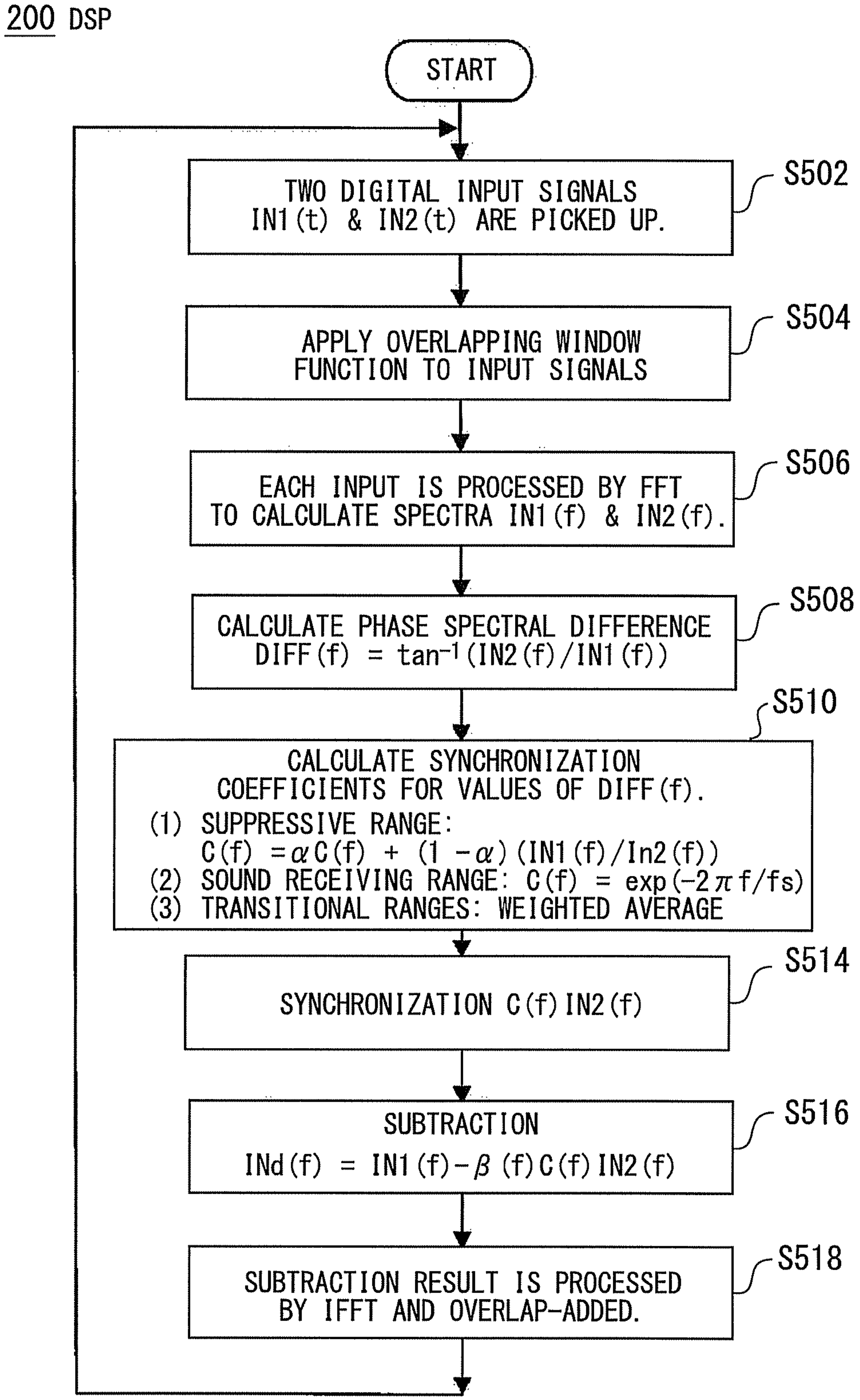
FIG. 5 illustrates exemplary processing operations performed by a digital signal processor (DSP) according to a program stored in a memory to calculate complex spectra.

FIG. 5 illustrates operations executed by a digital signal processor (DSP) 200 illustrated in FIG. 3A in accordance with a program stored in the memory 202 to calculate complex spectra. Therefore, FIG. 5 illustrates operations performed for example, by components 212, 214, 220, 300, and 382 illustrated in FIG. 3A.

Referring to FIGS. 3A and 5, the digital signal processor 200 (fast Fourier transforming parts 212 and 214) accepts the two digital input signals IN1($t$) and IN2($t$) in the time domain supplied from the analog-to-digital converters 162 and 164, respectively, at operation S502.

At operation S504, the digital signal processor 200 (FFT parts 212 and 214) multiplies the two digital input signals IN1($t$) and IN2($t$) by an overlapping window function.

At operation S506, the digital signal processor 200 (FFT parts 212 and 214) Fourier-transforms the digital input signals IN1($t$) and IN2($t$) to calculate complex spectra IN1($f$) and IN2($f$) in the frequency domain.

At operation S508, the digital signal processor 200 (phase difference calculating part 222 of the synchronization coefficient generation part 220) calculates the phase difference DIFF(f) between the spectra IN1($f$) and IN2($f$), i.e., $$DIFF(f)=\tan^{-1}(IN2(f)/IN1(f)).$$

At operation S510, the digital signal processor 200 (synchronization coefficient calculating part 224 of the synchronization coefficient generation part 220) calculates the ratio C(f) of the complex spectrum of the input signal to the microphone MIC1 to the complex spectrum of the input signal to the microphone MIC2 based on the phase difference DIFF(f) according to the following:

(a) Where the phase difference DIFF(f) has a value lying within the suppressive angular range, the synchronization coefficient C(f, i) may be given by:

$$\begin{aligned} C(f, i) &= Cn(f, i) \\ &= \alpha C(f, i-1) + (1-\alpha) IN1(f, i) / IN2(f, i). \end{aligned}$$

(b) Where the phase difference DIFF(f) has a value lying within the sound receiving range, the synchronization coefficient C(f) may be given by:

$$\begin{aligned} C(f) &= CS(f) \\ &= \exp(-j2\pi f / fs) \text{ or} \end{aligned}$$

$$\begin{aligned} C(f) &= Cs(f) \\ &= 0 \end{aligned}$$

(c) Where the phase difference DIFF(f) has a value lying within any one transitional angular range, the synchronization coefficient C(f) (=Ct(f)) is the weighted average of Cs(f) and Cn(f).

At operation S514, the digital signal processor 200 (synchronization part 332 of the filter part 300) performs a calculation given by a formula, INs2($f$)=C(f) IN2($f$), to synchronize the complex spectrum IN2($f$) to the complex spectrum IN1($f$) and to calculate the synchronized spectrum INs2($f$).

At operation S516, the digital signal processor 200 (subtraction part 334 of the filter part 300) subtracts the complex spectrum INs2($f$) multiplied by the coefficient β(f) from the complex spectrum IN1($f$) (i.e., INd(f)=IN1($f$)−β(f)×INs2($f$)), thus calculating a noise-suppressed complex spectrum INd (f).

At operation S518, the digital signal processor 200 (inverse fast Fourier transform (IFFT) part 382) accepts the spectrum INd(f) from the synchronization coefficient calculating part 224, inverse Fourier transforms the spectrum, overlap-adds it, and calculates an output signal INd(t) in the time domain at the position of the microphone MIC1.

[The program control may return to operation S502. The operations S502 to S518 may be repeated during a given period to process inputs made in a given interval of time.

According to an exemplary embodiment, noise in input signals may be reduced in a relative manner by processing input signals to the microphones MIC1 and MIC2 in the frequency domain. The phase difference may be detected at higher accuracy by processing input signals in the frequency domain as described previously rather than by processing the input signals in the time domain. Consequently, speech having reduced noise and thus having higher quality may be calculated. The above-described method of processing input signals from the two microphones may be applied to a combination of any arbitrary two microphones among plural microphones (see, for example, the FIG. 1).

According to an exemplary embodiment, in a case where recorded speech data including background noise is processed, a suppression gain of about 6 dB would be obtained compared with a suppression gain of about 3 dB achieved by the conventional method.

Figure 6A:
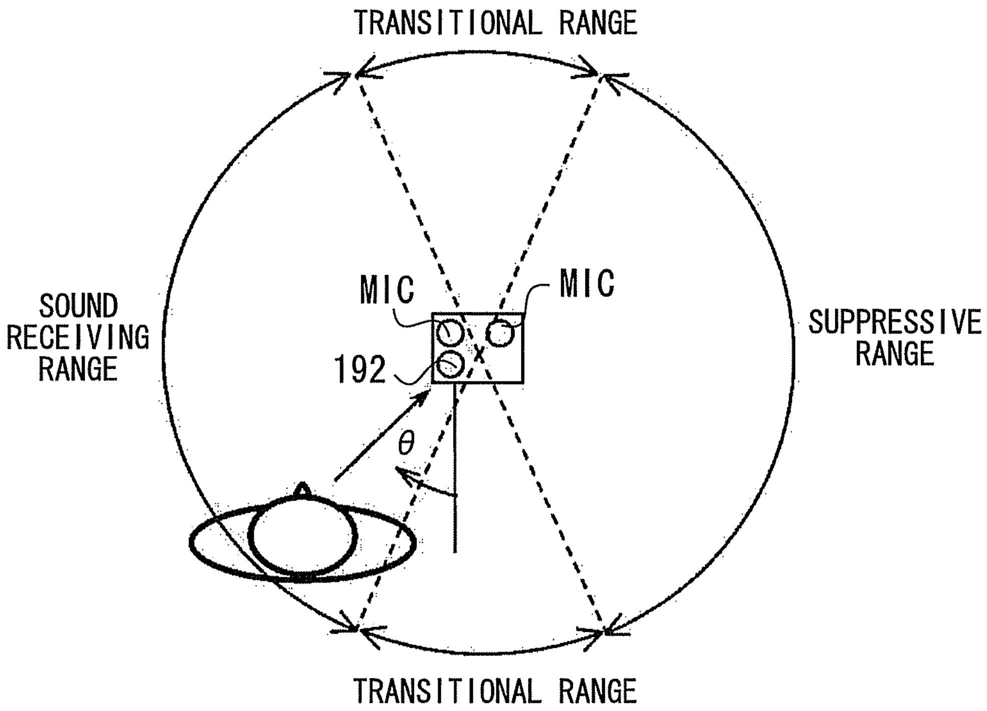
FIGS. 6A and 6B illustrate how a sound receiving range, a suppressive range, and transitional ranges may be set based on sensor data or on data keyed in an exemplary embodiment.
Figure 6B:
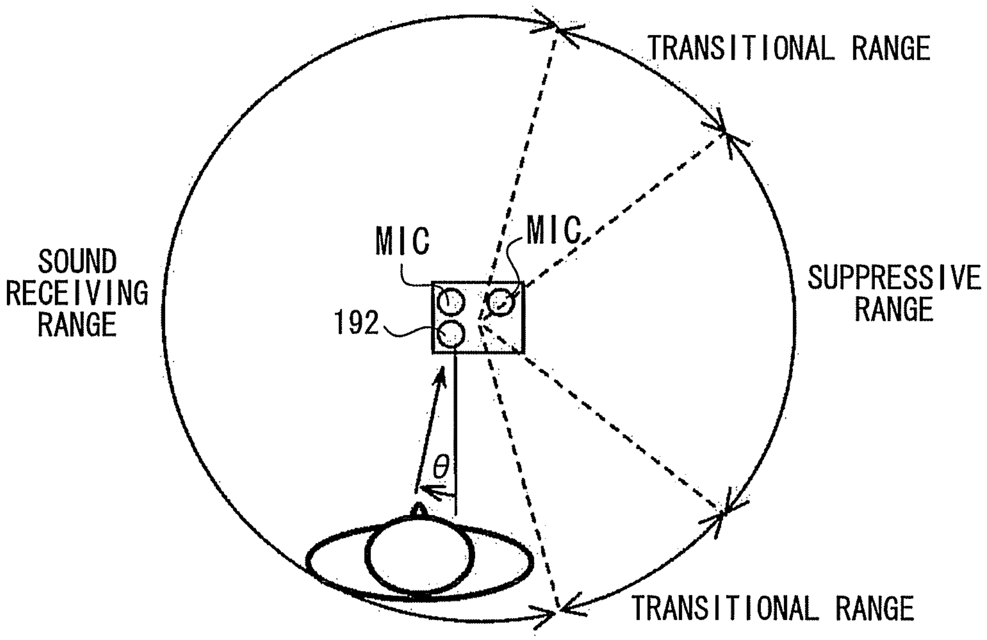

FIGS. 6A and 6B illustrate an exemplary way in which a sound receiving range, a suppressive range, and transitional ranges are set based on data derived from the sensor 192 or data keyed in. The sensor 192 detects the position of the body of the speaker. The direction determination part 194 may set the sound receiving range so as to cover the speaker's body according to the detected position. The direction determination part 194 may set the transitional ranges and the suppressive range according to the sound receiving range. Information about the setting is supplied to the synchronization coefficient calculating part 224 of the synchronization coefficient generation part 220. The synchronization coefficient calculating part 224 may calculate the synchronization coefficient according to the set sound receiving range, suppressive range, and transitional ranges.

In FIG. 6A, the speaker's face may be located on the left side of the sensor 192. The sensor 192 detects the center position θ of the facial region A of the speaker. The center position is represented, for example, by an angular position θ (=θ1=−π/4) within the sound receiving range. In this case, the direction determination part 194 may set the angular range for received sound based on the data (θ=θ1) obtained by the detection such that the angular range covers the whole facial region A and that the angular range is narrower than the angle π. The direction determination part 194 may set the whole angular range of each of the transitional ranges adjacent to the sound receiving range, for example, to a given angle π/4. The direction determination portion 194 may set the whole suppressive range located on the opposite side of the sound receiving range to the remaining angle.

In FIG. 6B, the speaker's face may be located under or on the front side of the sensor 192. The sensor 192 detects the center position θ of the facial region A of the speaker. The center position is represented, for example, by an angular position θ (=θ2=0) within the sound receiving range. In this case, the direction determination part 194 may set the angular range for received sound based on the data (θ=θ2) obtained by the detection such that the angular range covers the whole facial region A and that the angular range is narrower than the angle n. The direction determination part 194 may set the whole angular range of each of the transitional ranges adjacent to the sound receiving range, for example, to a given angle π/4. The direction determination part 194 may set the whole suppressive range located on the opposite side of the sound receiving range to the remaining angle. Instead of the position of the face, the position of the speaker's body may be detected.

Where the sensor 192 is a digital camera, the direction determination part 194 recognizes image data accepted from the digital camera by an image recognition technique and judges the facial region A and its center position θ. The direction determination part 194 may set the sound receiving range, transitional ranges, and suppressive range based on the facial region A and its center position θ.

In this way, the direction determination part 194 may variably set the sound receiving range, suppressive range, and transitional ranges according to the position of the face or body of the speaker detected by the sensor 192. Alternatively, the direction determination part 194 may variably set the sound receiving range, suppressive range, and transitional ranges in response to manual key entries. The sound receiving range may be made as narrow as possible by variably setting the sound receiving range and the suppressive range in this way. Consequently, undesired noise at each frequency in the suppressive range made as wide as possible may be suppressed.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A signal processing unit comprising:

a receiving device to receive input sound signals on a time axis;

a transforming device to transform two of the input sound signals into respective spectral signals on a frequency axis;

an obtaining device to obtain a phase difference between two spectral signals on the frequency axis at each frequency of a plurality of frequencies; and a phasing device to phase each component of a first one of the two spectral signals based on the phase difference between the two spectral signals at each frequency, to calculate a phased spectral signal and combining the phased spectral signal and a second one of the two spectral signals to calculate a filtered spectral signal, wherein a determined range of the phase difference corresponds with a synchronization coefficient applied in the phasing.

2. The signal processing unit according to claim 1, comprising calculating the synchronization coefficient indicating an amount of phase shift of each component of the first spectral signal at each frequency according to the phase difference, wherein the phase difference indicates a direction of arrival of sound at two sound input parts receiving the input sound signals.

3. The signal processing unit according to claim 2, wherein the synchronization coefficient indicating the phase difference between the two spectral signals is calculated depending on whether the phase difference corresponds either to a direction from which a desired signal comes or to a direction from which noise comes.

4. The signal processing unit according to claim 3, wherein for every time frame, when the phase difference corresponds to a direction from which noise comes, a ratio between the two spectral signals is calculated where the synchronization coefficient is calculated based on the ratio between the two spectral signals.

5. The signal processing unit according to claim 3, wherein when the phase difference corresponds to a direction from which desired a signal comes, the synchronization coefficient is made a constant value or a function indicating the phase difference is proportional to a frequency.

6. The signal processing unit according to claim 3, wherein the filtered spectral signal is calculated by subtracting a given ratio of the phased spectral signal from the second spectral signal, the given ratio corresponding to a frequency.

7. The signal processing unit according to claim 3, wherein a range of directions from which the desired signal comes is set based on information indicating a direction of a speaker, the range of directions indicating the given range regarding the phase difference.

8. The signal processing unit according to claim 2, wherein for every time frame, when the phase difference corresponds to a direction from which noise comes, a ratio between the two spectral signals is calculated where the synchronization coefficient is calculated based on the ratio between the two spectral signals.

9. The signal processing unit according to claim 8, the filtered spectral signal is calculated by subtracting a given ratio of the phased spectral signal from the second spectral signal, the given ratio corresponding to a frequency.

10. The signal processing unit according to claim 2, wherein when the phase difference corresponds to a direction from which a desired signal comes, the synchronization coefficient is made a constant value or a function indicating the phase difference is proportional to a frequency.

11. The signal processing unit according to claim 10, wherein the filtered spectral signal is calculated by subtracting a given ratio of the phased spectral signal from the second spectral signal, the given ratio corresponding to a frequency.

12. The signal processing unit according to claim 2, wherein the filtered spectral signal is calculated by subtracting a given ratio of the phased spectral signal from the second spectral signal, the given ratio corresponding to a frequency.

13. The signal processing unit according to claim 12, wherein the given ratio is calculated depending on whether the phase difference corresponds either to a direction from which a desired signal comes or to a direction from which noise comes.

14. The signal processing unit according to claim 2, wherein a range of directions from which a desired signal comes is set based on information indicating a direction of a speaker, the range of directions indicating the given range regarding the phase difference.

15. The signal processing unit according to claim 1, wherein the filtered spectral signal is calculated by subtracting a given ratio of the phased spectral signal from the second spectral signal, the given ratio corresponding to a frequency.

16. The signal processing unit according to claim 15, wherein the given ratio is calculated depending on whether the phase difference corresponds either to a direction from which a desired signal comes or to a direction from which noise comes.

17. The signal processing unit according to claim 1, wherein a range of directions from which a desired signal comes is set based on information indicating a direction of a speaker, the range of directions indicating the given range regarding the phase difference.

18. The signal processing unit according to claim 1, wherein application of the synchronization coefficient used in the phasing is varied based on the determined range corresponding with the phase difference obtained.

19. A signal processing method causing a computer to function as a signal processing unit, the signal processing method comprising:

transforming two sound signals input from at least two sound input parts on a time axis into respective spectral signals on a frequency axis;

calculating, using the computer, a phase difference between the transformed two spectral signals on the frequency axis at each frequency of a plurality of frequencies;

phasing, when the phase difference is within a given range, each component of a first spectral signal, based on the phase difference between the two spectral signals at each frequency and generating a phased spectral signal; and combining the phased spectral signal and a second spectral signal of the two spectral signals, and calculating, using the computer, a filtered spectral signal based on the combining, and wherein a determined range of the phase difference corresponds with a synchronization coefficient applied in the phasing.

20. A non-transitory computer-readable recording medium storing a computer program for causing a computer to function as a signal processing unit, the computer program the computer to execute a process comprising:

transforming two of sound signals input from the at least two sound input parts of the computer on a time axis into respective spectral signals on a frequency axis;

calculating, using the computer, a phase difference between the transformed two spectral signals on the frequency axis at each frequency of a plurality of frequencies;

phasing, when the phase difference is within a given range, each component of a first spectral signal of the two spectral signals based on the phase difference between the two spectral signals at each frequency and generating a phased spectral signal;

combining the phased spectral signal and a second spectral signal of the two spectral signals, and calculating, using the computer, a filtered spectral signal based on the combining, and wherein a determined range of the phase difference corresponds with a synchronization coefficient applied in the phasing.

21. A signal processing method comprising:

transforming, using a microprocessor, sound signals input from a plurality of sound parts on a time axis into respective spectral signals on a frequency axis;

calculating a phase difference between the transformed two spectral signals at each frequency of a plurality of frequencies; and phasing, when the phase difference is within a given range, each component of a first spectral signal based on the phase difference between the two spectral signals at each frequency, generating a phased spectral signal, combining the phased spectral signal and a second spectral signal of the two spectral signals, and calculating a filtered spectral signal based on the combining, and wherein a determined range of the phase difference corresponds with a synchronization coefficient applied in the phasing.

* * * * *

UNITED STATES PATENT AND TRADEMARK OFFICE

CERTIFICATE OF CORRECTION

PATENT NO. : 8,565,445 B2
APPLICATION NO. : 12/621706
DATED : October 22, 2013
INVENTOR(S) : Naoshi Matsuo It is certified that error appears in the above-identified patent and that said Letters Patent is hereby corrected as shown below:

In the Claims

In Column 14, Line 12, In Claim 20, after “the computer program” insert -- causing --.

Signed and Sealed this
Eighteenth Day of February, 2014

Michelle K. Lee
*Deputy Director of the United States Patent and Trademark Office*